Figure 1:
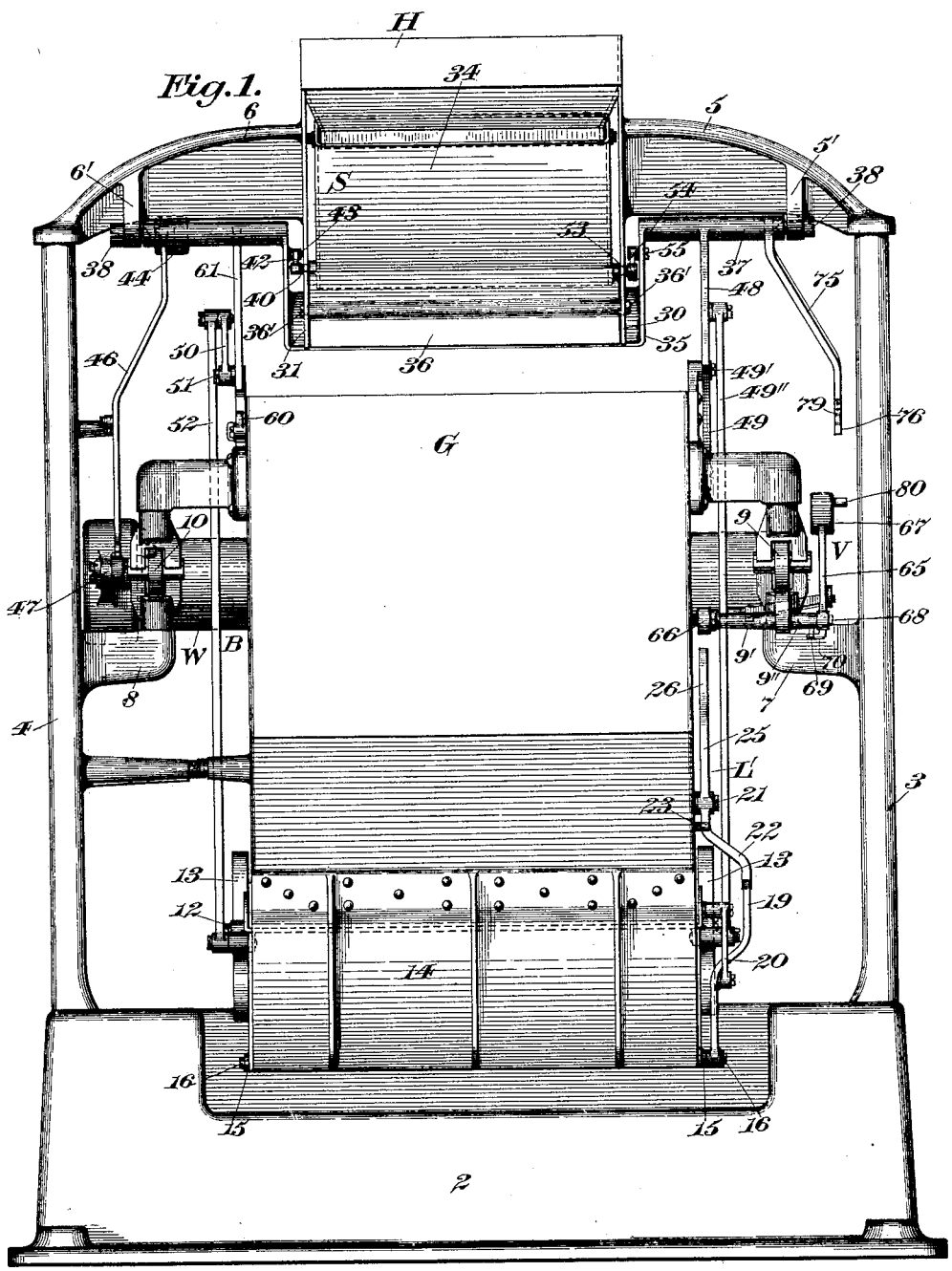

(No Model.) 5 Sheets—Sheet 1.

F. H. RICHARDS.
WEIGHING MACHINE.

No. 600,029. Patented Mar. 1, 1898.

Witnesses:
O. W. Smith
Fred. J. Dole.

Inventor:
F. H. Richards.

(No Model.)

F. H. RICHARDS.
WEIGHING MACHINE.

No. 600,029.  Patented Mar. 1, 1898.

Witnesses:
O. W. Smith
Fred. J. Dole.

Inventor:
F. H. Richards (No Model.)  5 Sheets—Sheet 3.

F. H. RICHARDS.
WEIGHING MACHINE.

No. 600,029. Patented Mar. 1, 1898.

Witnesses:
O. W. Smith
Fred. J. Dole.

Inventor:
F. H. Richards.

(No Model.) 5 Sheets—Sheet 4.

F. H. RICHARDS.
WEIGHING MACHINE.

No. 600,029. Patented Mar. 1, 1898.

Witnesses:
O. W. Smith
Fred. J. Dole.

Inventor:
F. H. Richards (No Model.)
F. H. RICHARDS.
WEIGHING MACHINE.
No. 600,029.
5 Sheets—Sheet 5.
Patented Mar. 1, 1898.
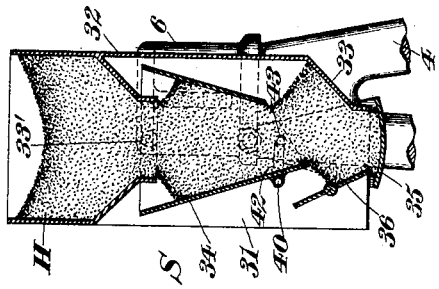
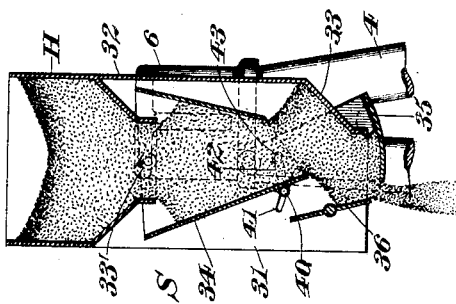
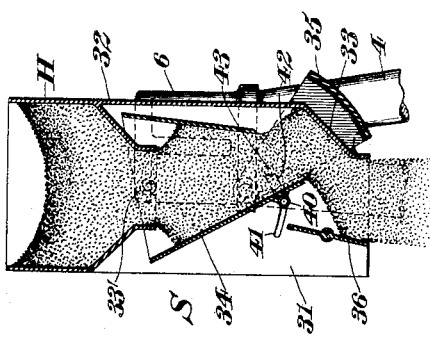
Witnesses:
O. W. Smith
Fred. J. Dole.
Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 600,029, dated March 1, 1898.

Application filed August 4, 1897. Serial No. 647,086. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering various kinds of granular and other free-flowing substances.

One of the objects of the invention is to furnish, in connection with the weighing mechanism, a variable-efficiency device shiftably carried thereby and a supply-valve provided with means for actuating the variable-efficiency device preferably before and just prior to the discharge of a load.

In the form of the invention represented the variable-efficiency device is in the form of a gravity member supported for oscillation by the beam and is shifted by a rod connected with the supply-valve just prior to the completion of a load, so as to augment the weight of the load-receiver to such an extent as to carry it downward without delay. The variable-efficiency device, which consists of a counterweighted lever, also serves as a tripper for the load-discharge-controlling latch, so that said latch can be tripped instantly and without the necessity of relying upon any of the other parts of the weighing mechanism.

Another object is to furnish, in connection with a load-receiver having a guard-plate attached to and extending below the same, a regulator mounted relatively to the guard-plate and so disposed as to constitute, in connection therewith, a trough to catch any leakage from the load-receiver during the making up of a load. The load-receiver is furnished, preferably, with a closer, and the regulator, which is acted upon intermittingly by the discharging loads, serves, through proper instrumentalities, to retard the shutting movement of the closer.

Another object of the invention is to furnish a hopper having below its sides and rear a series of walls, one of which preferably has a portion obliquely disposed, and a swinging hopper that is situated in the space between said several walls and that is located at such an inclination as to deliver at the commencement of operation the supply-stream against said inclined or obliquely-disposed portion of the chute-wall, so that the force of impact of the supply as it flows toward the load-receiver is materially modified. At a subsequent stage in the operation the swinging hopper is moved outward in unison with a suitable valve, which latter, in conjunction with an auxiliary valve preferably provided, cuts off the supply to the load-receiver.

Figure 2:
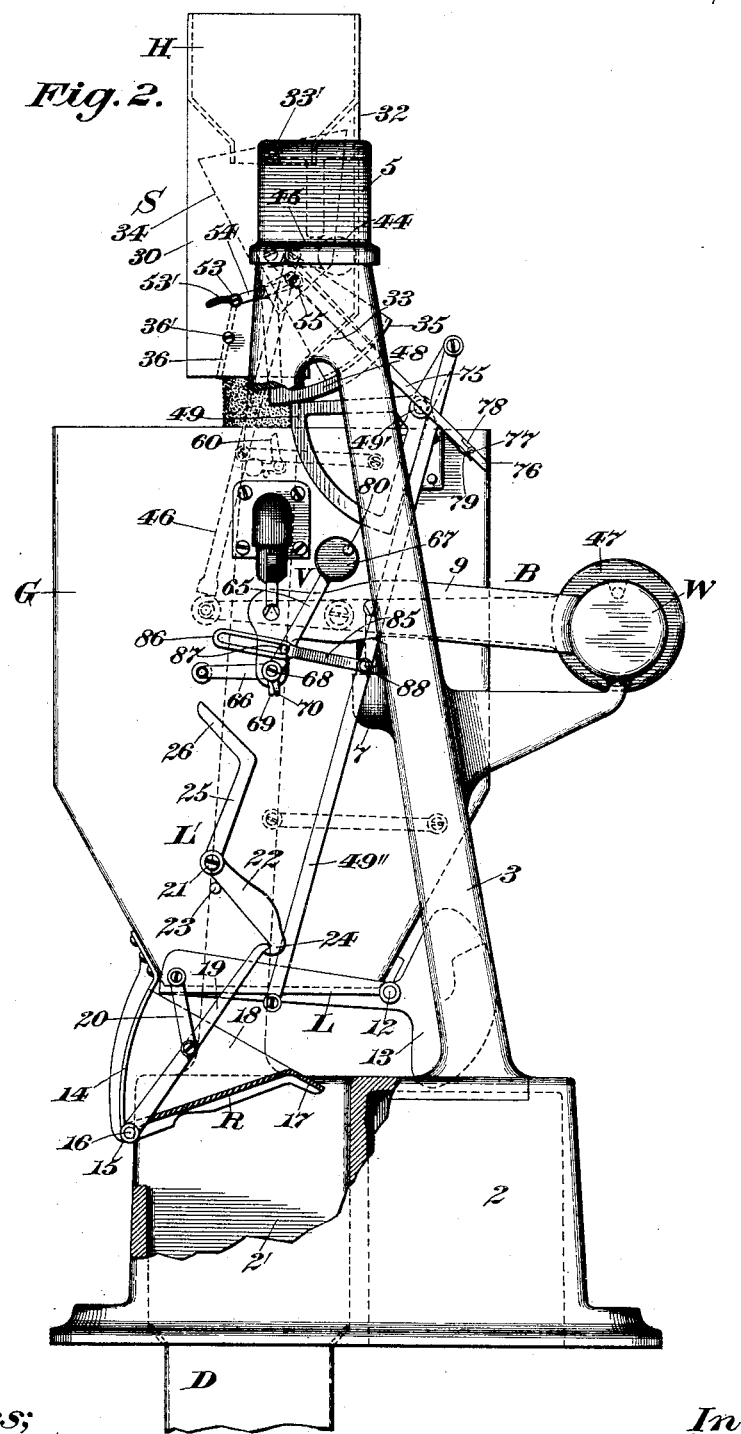
Figure 3:
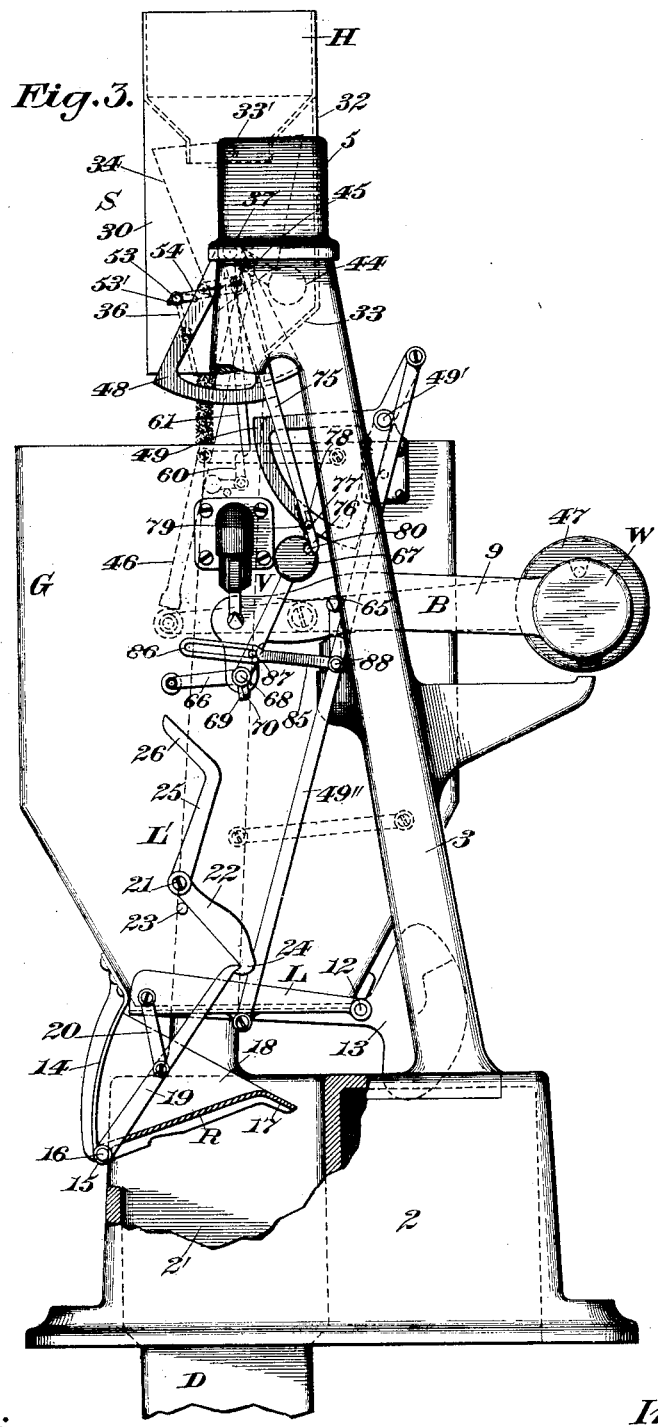
Figure 4:
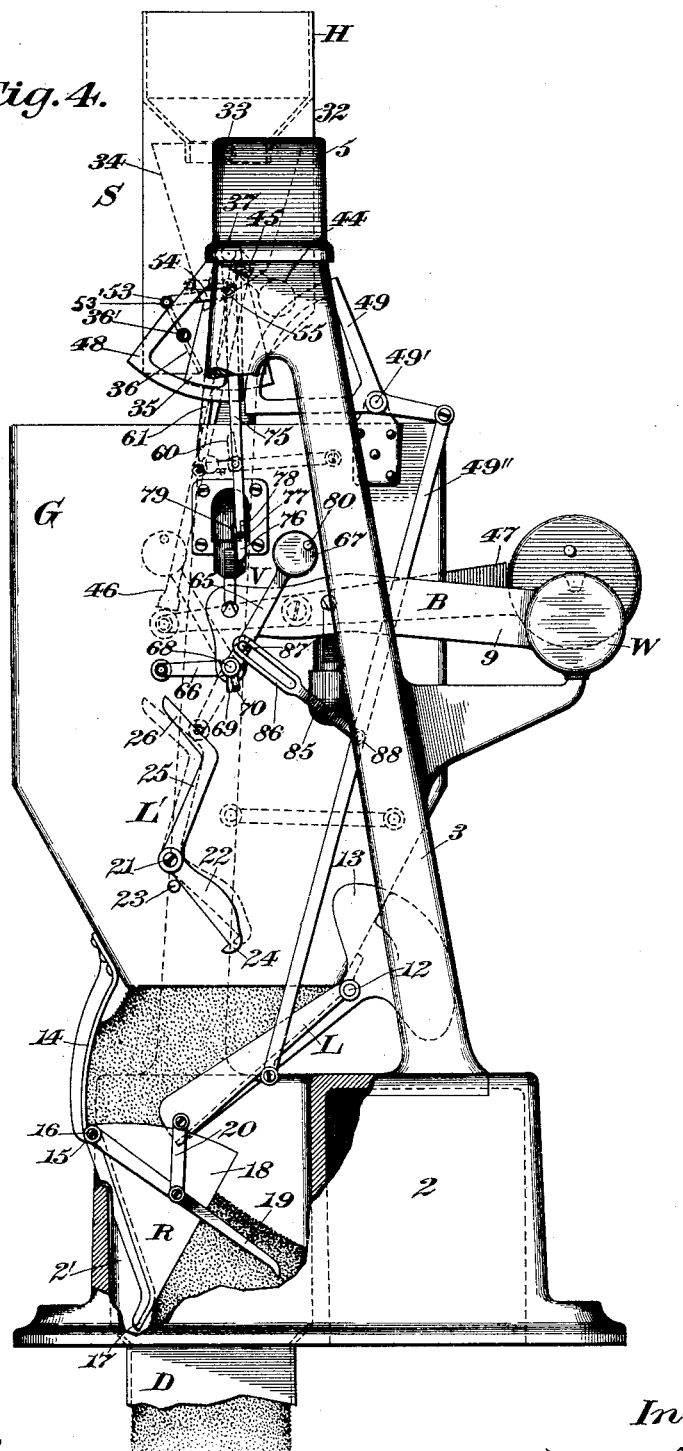

In the drawings accompanying and forming part of this specification, Figure 1 is a front elevation of my improved machine. Figs. 2, 3, and 4 are side elevations of the machine as seen from the right in Fig. 1, portions being broken away and in central vertical section, and the parts being represented in said figures in the positions they occupy during the making and discharging of a load. Figs. 5, 6, and 7 are longitudinal central sections of the supply apparatus.

Similar characters designate like parts in all the figures of the drawings.

The framework for sustaining the different parts of the machine may be of any suitable construction. It is illustrated consisting of the chambered base 2, the side frames 3 and 4, mounted thereon, and the brackets 5 and 6, extending oppositely from the supply apparatus, (designated in a general way by S and hereinafter more particularly described,) which are attached to the side frames 3 and 4, respectively.

The weighing mechanism may be of any convenient construction, it consisting of a load-receiver and counterpoising means, as customary. The weighing mechanism in the present case comprises a hopper-shaped load-receiver G and the counterweighted scale-beam B, the latter being pivotally supported upon brackets 7 and 8, extending inward from the side frames 3 and 4, respectively, and the load-receiver being sustained upon the poising end of the beam.

The beam B consists of a pair of arms 9 and 10, joined at the rear by counterweight W.

The load-receiver G has in its lower end the usual discharge-outlet, covered by the closer or flap L, consisting of a flat plate pivoted, as at 12, to the lower rear side of the load-receiver and furnished with the counterweighted end plates 13, serving as a convenient means to shut the closer when the load has passed therefrom.

The load-discharge-controlling means includes as a part thereof a latch adapted to engage a member coöperative with the closer, as will hereinafter appear. On the tripping of the latch the closer is released and forced open by the pressure of the material in the load-receiver.

The load-receiver has secured to its front wall, in the lower end thereof, the guard-plate 14, which extends below the same and with which a regulator, as R, is coöperative, the regulator being so mounted relatively to the guard-plate during the normal operation of the machine, as shown in Fig. 2, as to form a trough for catching any material that may escape from the load-receiver, it being apparent that any material that drops into the trough thus formed constitutes a part of the load. The regulator is movably connected with the guard-plate 14 and also with the closer, so that it may be shifted by and on the opening of the closer into the path of the discharging material, the weight of which can hold the regulator down, so that the closer will be maintained in its wide-open position sufficiently long to cause the complete discharge of the load.

The guard-plate 14 has at its lower end the bearings or hubs 15 for receiving the pivots 16 at opposite ends of the regulator R, which is in the form of a flat plate having a deflected end 17. The regulator is also furnished at its opposite sides with the walls 18, fitting when in its normal position against the guard-plate, as shown in Fig. 2, whereby the two parts form a trough or receptacle for receiving any material that may drop from the closer. One of the pivots 16 of the regulator (shown as the one on the right in Fig. 1) has secured thereto the rock-arm 19, to which is pivoted the link 20, likewise jointed to the closer L. The upper or free end of the rock-arm 19 is in position to be engaged by a detent or latch, such as L', consisting of a lever, pivoted at 21 on the load-receiver, the counterweighted arm 22 of the latch normally resting against the stop 23 on the load-receiver and the shouldered end or catch 24 of the latch being thrown into engagement with the coöperating arm 19, connected, respectively, with the closer and the regulator to hold said parts against movement. The upper arm 25 of the latch is angular, the angular portion 26 being engaged by a tripper, as will hereinafter appear, to raise the weighted arm 22 out of engagement with the rock-arm 19, thereby simultaneously to release the closer and regulator. When these parts are released, the pressure of material in the load-receiver G, acting against the closer, will force the latter open, and through the connections between the closer and regulator said regulator will be shifted or lowered, as shown in Fig. 4, the load being discharged into the conduit D, situated in the chamber 2' of the base. The material will act directly against the regulator R, and the latter being connected with the closer said closer is positively held open.

The supply apparatus S, to which I have hereinbefore referred, includes as a part thereof the main hopper H, which is preferably stationary and provided with the vertical side walls 30 and 31 and the rear wall 32, the latter having the inclined or oblique portion 33 near its lower end, against which the supply-stream during the greater period of operation of the machine is directed, as indicated in Fig. 5, so that the force of impact thereof is materially broken and cannot affect the accuracy of the machine. The supply-stream is directed against the inclined portion 33 of the rear chute-wall by the swinging hopper 34, which is pivoted, as at 33', to the hopper H and which is tubular in shape and located below said hopper H.

The swinging hopper 34 is disposed in the space between the chute-walls 30, 31, and 32 and normally at an inclination, as illustrated in Fig. 5, to direct the supply-stream from the hopper H against the inclined portion 33 of the rear wall 32 of the chute, the material then gravitating into the load-receiver.

For the purpose of controlling the passage of the material to the load-receiver valves are furnished, the main valve being designated by 35 and the auxiliary valve by 36. The main valve 35 is of the "pan" type, it being oscillatory below the chute-walls 30, 31, and 32 and carried by the two-part shaft 37, having journal-openings in its opposite ends for receiving the pivot-screws 38 on the arms 5' and 6', respectively.

When the load is nearly completed, the chute 34 is moved outward and preferably simultaneously with the pan-valve, these two parts being conveniently connected to effect this result. The swinging hopper has at one side thereof the projection 40, passing through the curved slot 41 in the chute-wall 31, the link 42 loosely embracing the projection and being pivoted, as at 43, to the valve 35. (See Figs. 1 and 5.)

For swinging the valve 35 under the chute-walls 30, 31, and 32 into the path of the supply-stream to arrest its passage to the load-receiver I provide the weight 44, secured to the arm 45, extending rearward from the valve-shaft 37, the rod 46 being pivoted to the arm 45 and bearing against the counterweighted lever 47, shiftably supported upon the beam-arm 10 and serving as a valve-opening actuator. The counterweighted lever is mounted and operates in the manner shown in Letters Patent No. 548,840, granted to me October 28, 1895, to which reference may be had.

The usual interlocking stops are shown at 48 and 49, they being coöperative, respectively, with the valve and closer and operating in the manner shown in the patent just referred to. The stop 48 is secured to the valve-shaft 37, and the stop 49 is pivoted upon the load-receiver, as at 49', and connected with the closer L by the longitudinal rod 49″. The crank-arm 50 is pivoted, as at 51, to the opposite side of the load-receiver and has jointed thereto the rod 52, likewise attached at its lower end to the closer L, the rods 49″ and 52 moving in parallelism as the closer opens and shuts.

The auxiliary valve 36 consists of a longitudinal plate supported for oscillation between the chute-walls 30 and 31 and having bearings at its opposite ends and at the middle for receiving the pivots 36′ on the two chute-walls, the auxiliary valve or plate 36 coöperating with the pan or oscillatory valve 35 to cut off the supply. The auxiliary valve 36 is preferably connected with the main valve 35 for operation. The auxiliary valve has in its upper edge a projection 53, passing through the longitudinal slot 53′ on the chute-wall 30, which is embraced by the link 54, pivoted at its opposite end to the valve 35, (see Figs. 1 and 2,) the pivotal point 55 being below the center of oscillation of the valve. When the valve is closed or swung under the chute-walls 30, 31, and 32 by the dropping of the weight 44, the link 54 will be moved in a corresponding direction or to the left, thereby swinging the lower portion of the auxiliary valve 36 in an opposite direction, as indicated, respectively, in Figs. 6 and 7, the auxiliary valve being moved from the main or pan valve 35 when the load is fully completed, so that the supply-stream is stopped. The counterweighted lever 47, operative in the usual manner and constituting in effect an integral extension of the beam and descendible therewith, serves by being in contact with the rod 46 to control the action of the valves 35 and 36 through the rod 46.

The progress of the valve mechanism is intercepted by the by-pass stop 60, situated near the upper end of the load-receiver and coöperating with the rod 61 in the manner shown in the Letters Patent hereinbefore referred to, the rod being secured to the valve-supporting shaft 37 and impinging against the by-pass stop 60 when the load is nearly completed, as shown in Fig. 3, so as to permit a reduced or drip stream to flow from the supply apparatus S into the load-receiver to top off the partial load.

In connection with the weighing mechanism I provide a variable-efficiency device, preferably mounted upon the beam B and adapted when shifted to augment the weight of the load-receiver. This variable-efficiency device is actuated, preferably, by means operative with the valve and at a point just before the last part of the load is in the receiver G, so that the latter can be carried downward promptly to cause the operation of the valves 35 and 36. The remainder of the load is received at about the time the latch L′, to which I have hereinbefore referred, is tripped.

The variable-efficiency device is designated by V, and it consists of the arms 65 and 66, the latter being counterweighted, as at 67. The arms 65 and 66 are disposed at an angle to each other and are attached to the rock-shaft 68, carried by the beam-arm 9 and the oppositely-disposed bearing-sleeves 9′ and 9″, extending from said beam-arm, as represented more clearly in Fig. 1. The bearing-sleeve 9″ is provided with a stop 69, against which the angular projection 70 of the arm 65 normally rests to hold the variable-efficiency device in its normal position. The rock-shaft 68 is situated at the poising or inner end of the beam B, and the center of gravity of the weight is situated at a comparatively remote point from the center of oscillation of the variable-efficiency device, as indicated in Fig. 3. At the proper point said device is shifted to transfer its effect to the opposite side of its center of oscillation, as shown in Fig. 4 by the dotted lines, the effect being to increase the weight of the load-receiver G, so that the same is carried instantly downward. The actuating means of the variable-efficiency device is preferably operative with the valve and consists of a rod 75, secured to and depending from the valve-shaft. The rod 75 terminates in the switch or by-pass device, pivoted, as at 77, thereto and having the stop or tailpiece 78 normally held against the rod by the spring 79, secured to said rod. When the valve-rod 61 strikes the by-pass 60 to intercept the closure of the valves 35 and 36, the lower end of the actuating-rod 75 will abut against the projection or pin 80 on the weight 67. When the load-receiver descends sufficiently far to carry the by-pass 60 below the rod 61, the two valves are released, so that they can be shut by the weight 44, and the lower end of the rod 75 abutting against the pin 80 the valve can shift the variable-efficiency device to throw the weight 67 to the left of its center of oscillation, as shown by the dotted lines in Fig. 4. On the return stroke of the valve the switch 76 on the free end of the rod 75, which returns with the valve, will strike and pass by the pin 80.

The means for resetting the variable-efficiency device is preferably operative with the load-discharging device or closer L. The resetting means for the variable-efficiency device consists of the link 85, connected therewith by a slide-joint, as the loop 86, embracing the pin 87 on the arm 65. The opposite end of the link 85 is pivoted, as at 88, to the rod 49″. By reason of the slide-joint just described the variable-efficiency device can be shifted in the manner specified without affecting the relation of the other parts by which it is reset. At the commencement of operation, as shown in Fig. 2, the pin 87 is at the inner end of the loop 86. When said variable-efficiency device is shifted, the pin will strike the opposite end of the loop. On the opening of the closer the rod 49″ will be drawn downward and swung slightly to the right, thereby pulling the link 85 in a corresponding direction and shifting the variable-efficiency device V, so that the weight 67 is carried from the left to the right side of the center of oscillation of said variable-efficiency device and farther away from the center of gravity of the weight.

The variable-efficiency device constitutes also a tripper for the latch L', the arm 66 thereof being adapted to strike the angular portion 26 of the latch-arm 25, whereby the latch is promptly tripped and disengaged from the rock-arm 19.

The operation of the hereinbefore-described machine, briefly set forth, is as follows: In Figs. 1, 2, and 5 the various parts of the machine are shown as occupying their normal positions, the closer L and regulator R being locked in their primary positions by the counterweighted latch L', which is in engagement with the rock-arm 19. The valves 35 and 36 being wide open, a stream of large volume will flow from the hoppers H and 34 and against the stream-brake 33, and from thence into the empty load-receiver. When a certain proportion of the load has been received, the load-receiver and beam mechanism will descend, so that the counterweighted lever 47, by falling away from the rod 46, will permit the two valves 35 and 36 to be closed, in the manner hereinbefore set forth, by the dropping of the counterweight 44 and until the rod 61 abuts against the by-pass 60, at which time the actuating-rod 75 will be against the pin 80 on the weight 67. The by-pass 60 and rod 61 being in engagement, the valve mechanism will be held, as shown in Figs. 3 to 6, and permit a reduced stream to flow into the receiver G for the purpose of completing the load. When the by-pass stop 60 passes below the rod 61, the two valves are released and can be shut by the counterweight 44, the valves serving to swing the rod 75, the lower end of which, being in engagement with the pin 80, will shift the variable-efficiency device V in the manner hereinbefore set forth and cause the arm 66 of said device to impinge against the latch-arm 26, thereby to raise the latch-arm 22 away from the coöperating rock-arm 19. When the latch is tripped, the regulator R and closer L are freed, and the closer is forced open by the load in the receiver and simultaneously, through the described connections, serves to shift the regulator, so that the load can act against the regulator to hold it down. The regulator being acted upon in such manner it will, through the described connections, serve to hold the closer open. When the material passes clear of the regulator, the latter is released, at which time the weights 13 of the closer can shut the same, following which the other parts of the machine will be returned to their primary positions to repeat the operation.

Having described my invention, I claim—

1. The combination of weighing mechanism; a variable-efficiency device shiftably mounted upon the weighing mechanism; and a supply-valve provided with means for actuating the variable-efficiency device.

2. The combination of weighing mechanism embodying a load-receiver and a scale-beam; a variable-efficiency device shiftably mounted upon the scale-beam; and a supply-valve provided with means for actuating the variable-efficiency device.

3. The combination of a load-receiver; a scale-beam; a counterweighted oscillatory device shiftably mounted upon the scale-beam; means for normally holding said device in its ineffective position; and a supply-valve furnished with means for shifting said device prior to the discharge of a load.

4. The combination of a load-receiver; a scale-beam; a variable-efficiency device mounted upon the scale-beam; a supply-valve provided with means for actuating said device prior to the discharge of a load; and means for resetting said device.

5. The combination of weighing mechanism including a load-discharging member; a variable-efficiency device shiftably mounted upon the weighing mechanism; means for shifting said variable-efficiency device prior to the discharge of a load; and resetting means for said device, connected with said load-discharging member.

6. The combination of weighing mechanism; means including a latch for controlling the discharge of a load; a variable-efficiency device shiftably mounted upon the weighing mechanism and constituting a latch-tripper; a supply-valve; and means operative with the supply-valve for actuating the variable-efficiency device before the discharge of a load.

7. The combination of a load-receiver; a supporting scale-beam therefor; a variable-efficiency device shiftably supported upon the scale-beam; a supply-valve; and a rod connected with the supply-valve for operating the variable-efficiency device and provided with a switch at its working end.

8. The combination of a load-receiver; a scale-beam; a variable-efficiency device shiftably supported upon the scale-beam and having a pin; a supply-valve; and a rod connected with the supply-valve and having at its working end a spring-actuated switch adapted to engage said pin and to shift the variable-efficiency device on the closing movement of the valve.

9. The combination of a load-receiver; a supporting scale-beam; a counterweighted arm constituting a variable-efficiency device, shiftably mounted on the scale-beam; a load-discharging member; a rod connected with said load-discharging member; and a link jointed to said rod connected to the weighted arm by a slide-joint and serving to shift said arm.

10. The combination of a load-receiver having a load-discharging device; a scale-beam; a weighted arm shiftably mounted upon the scale-beam and having a projection; a rod connected with said load-discharging device; a link attached to said rod and having at its opposite end a loop embracing said projection; and shifting means for said weighted arm.

11. The combination of a load-receiver having a closer; a scale-beam; a weighted arm shiftably supported upon the scale-beam and having a projection; a rod connected with the closer; a link pivoted to said rod and having a longitudinal loop at its opposite end embracing said projection; a supply-valve; and means operative with the supply-valve for shifting said weighted arm.

12. The combination of weighing mechanism embodying a load-receiver; a guard-plate attached to and depending below the same; a regulator connected with the guard-plate; and regulator-holding means.

13. The combination of a load-receiver and its closer; a guard-plate attached to and depending below the load-receiver; a regulator mounted relatively to the guard-plate to form in connection therewith a trough; and means for holding the closer and regulator.

14. The combination of a load-receiver and its closer; a supporting scale-beam; a guard-plate attached to and depending below the load-receiver; a regulator connected with the guard-plate; connections between the regulator and the closer; and means for holding the regulator and closer.

15. The combination of a load-receiver provided with a closer; a guard-plate attached to and depending below the load-receiver; a regulator connected with the guard-plate; an arm coöperative with the regulator and closer; and a latch for engaging said arm.

16. The combination of a load-receiver and its closer; a scale-beam and guard-plate attached to and depending below the load-receiver; a regulator connected with the guard-plate; an arm connected with the regulator and closer; and a latch.

17. The combination of a load-receiver having a closer; a scale-beam; a guard-plate attached to the load-receiver; a regulator pivoted to the guard-plate; an arm secured to a pivot and connected by a link with the closer; and a latch for engaging said arm.

18. The combination of weighing mechanism; a chute located above the same and having depending side and rear walls, the rear wall having an inclined portion; a swinging hopper disposed in the space between said walls; and valve mechanism connected with the swinging hopper.

19. The combination of a chute having depending side and rear walls; a swinging hopper situated in the space between the said walls and having a projection passing through a slot in one of the walls; and a valve movable below said walls and connected, by a link, with said projection.

20. The combination of a chute having depending side and rear walls extending below the same; a swinging hopper situated in the space between said walls; a pan-valve connected with said hopper; and a second valve supported between said chute-walls and connected with the pan-valve.

FRANCIS H. RICHARDS.

Witnesses:
F. N. CHASE,
ANDREW FERGUSON.